Jan. 11, 1949.   V. ISACCO   2,458,855
PARACHUTE AND THE LIKE WITH
ROTATING SUSTAINING BLADES

Filed June 7, 1945   5 Sheets-Sheet 2

Inventor
Vittorio Isacco
By
Attorney

Jan. 11, 1949.  V. ISACCO  2,458,855
PARACHUTE AND THE LIKE WITH
ROTATING SUSTAINING BLADES

Filed June 7, 1945  5 Sheets-Sheet 3

Inventor
Vittorio Isacco
By
Attorney

Jan. 11, 1949.  V. ISACCO  2,458,855
PARACHUTE AND THE LIKE WITH
ROTATING SUSTAINING BLADES

Filed June 7, 1945  5 Sheets-Sheet 5

Inventor
Vittorio Isacco
By
Attorney

UNITED STATES PATENT OFFICE 2,458,855

PARACHUTE AND THE LIKE WITH
ROTATING SUSTAINING BLADES

Vittorio Isacco, London, England

Application June 7, 1945, Serial No. 598,112
In Great Britain December 1, 1944

21 Claims. (Cl. 244—138)

This invention has reference to parachutes and plane cabin parachutes with rotating sustaining blades, the term plane cabin parachute used herein being intended to include a cabin for the use of passengers, freight or other goods or even to include a simple crate for freight and the like.

The primary feature of the invention resides in providing the parachute or plane cabin parachute with means adapted to utilise the falling movement of the parachute or plane cabin in relation to the parent plane mechanically to drive the blades during the initial part of the fall. That is to say the energy of falling motion of the parachute or of the plane cabin is utilised mechanically to drive the sustaining blades during the initial part of the fall as distinct from (a) utilising the upward pressure of air alone to start the rotation and (b) utilising the energy of the falling motion to operate release gear which allows a spring motor to drive the blades initially.

The blades are preferably of telescopic form and fold to an out of the way position when not required for use. When they are rotated the resulting centrifugal force acting on them causes them to swing to their position of use (in which position they are locked automatically) and to extend after being so locked.

The outward sliding movement of the blade sections relatively is preferably limited by suitable shoulders which abut to stop the said movement. Retraction of the blade sections is preferably effected automatically when the apparatus grounds.

Compensating torque reaction may be effected by mechanical absorbers suitably located between the plane and the apparatus (the parachute or the plane cabin parachute), automatic release means being provided for disconnecting the absorber from the apparatus after the latter has fallen through a predetermined distance (say immediately after the mechanical driving of the blades has ceased) following its release from the plane. The said mechanical absorbers have to resist also the air resistance on the falling body or on the plane cabin.

In order that the blades may flap within predetermined limits during descent they are pivoted on substantially horizontal axes. A further feature of the invention resides in setting each of the said axes at such an angle to the longitudinal axis of its corresponding blade that an increase in the pitch angle of the blade takes place when it hinges downwardly and a decrease in the pitch angle takes place when the blade hinges upwardly. In effect this setting of the hinge axes produces oscillations around the axes perpendicular to the longitudinal axes of the blades and at the same time produces rotation around the longitudinal axes. This automatic variation of the blade's pitch angle, will have the effect of reducing the amplitude of the blade's oscillations as well as the lift and drag pressures during the horizontal movement of the parachute or plane cabin parachute after it leaves the parent plane.

Another feature of the invention resides in making the blades of variable thickness so that they become more conveniently balanced for lateral inertia reactions during their flapping period.

A still further feature of the invention resides in providing means enabling the pilot to control the direction of descent. This means comprises a lever upon which the pilot acts according to the direction he desires. The action on the lever produces an inclination of the axis of the apparatus in the same direction and consequently, as it is already known for rotating blade machines, to a translation movement in the said direction. For this purpose the apparatus is mounted on the top plate of the pilot's harness by means of a universal joint of any suitable form.

The features above referred to and described in the following may be applied separately, totally, or in combination.

The invention will now be described with reference to the accompanying drawings, which drawings are given by way of example.

Figure 1:
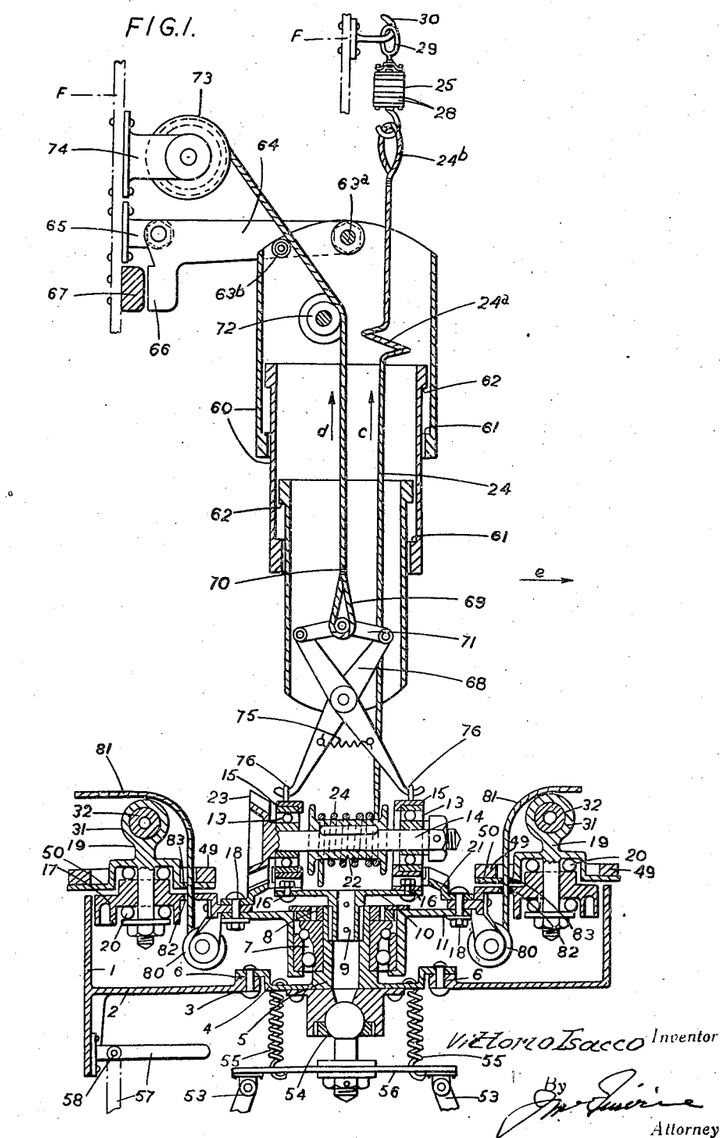
Fig. 1 is a vertical section showing, more particularly, starting gear for the sustaining blades and a mechanical torque reaction absorber, the plane of section of said gear being indicated by the line A—A, Fig. 2. For necessities of the drawing, the torque reaction absorber elements are shown much shorter than they are to be in practice.
Figure 2:
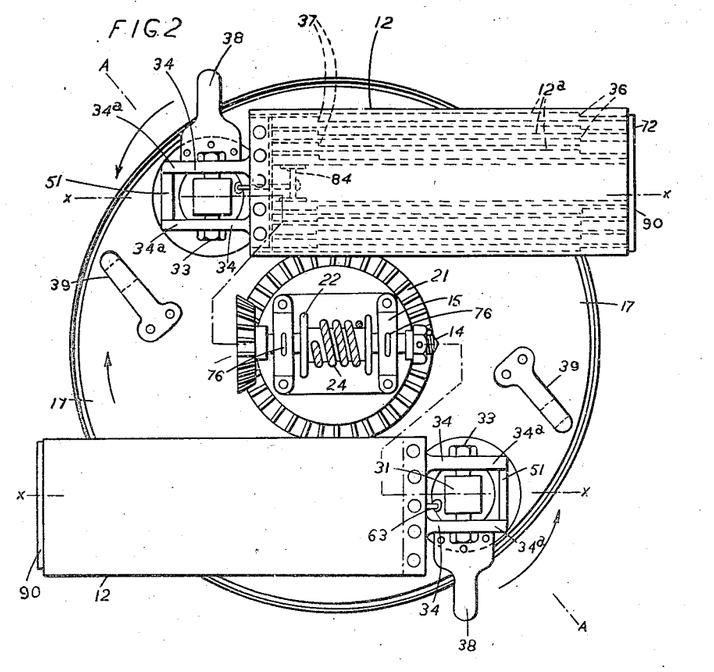
Fig. 2 is a plan view of the parachute shown in Fig. 1, the case 26 thereof having been removed and the blades being folded and collapsed.

The parachute shown in Figs. 1 and 2 comprises a cylindrical carrier or body 1 about midway of which is an internal partition 2, said partition having a circular opening 3 at its centre. A dished flange 4 at the bottom of a hollow boss 5 lies in the opening 3 and is secured to the partition by rivets 6. In this manner the boss 5 is fixed to the plate. The boss is at the centre of the flange and, therefore, is co-axial with the carrier 1. Around the boss is a double thrust ball bearing 7 held in place by a nut 8 which screws onto the boss 5; within the upper part of the hollow of the boss is fixed a stub 9 depending from a plate 10, the plate thus lying above the partition 2. Fixed to the outer race of the ball bearing is a top plate 11 which carries the telescopic sustaining blades 12, part of the gear for starting the blades in rotation and other elements to be fully described herein; and mounted on the plate 10 are ball bearings 13 for the horizontal shaft 14 of other elements of the starting gear, the casings 15 for the ball bearings 13 being fixed to the plate 10 by means of bolts and nuts 16.

The mounting for the sustaining blades comprises a circular member 17 fixed to the plate 11 by bolts and nuts 18, and vertical spigots 19 mounted in ball bearings 20. The bearings 20 are mounted on the member 17. That part of the starting gear for the blades mounted on the plate 11 comprises a bevel wheel 21 located around and co-axially of the plate 10. It is secured to the plate 11 by the bolts and nuts 18.

The elements of the starting gear mounted on the plate 10 comprises a pulley 22 fixed to the shaft 14 between the bearings 13 and a bevel pinion 23 rigid with the shaft at one end thereof, the pinion 23 meshing with the bevel wheel 21. A flexible wire, cord or the like 24 having one end wound around the pulley but not otherwise attached thereto extends from the pulley to a shock absorber 25, said wire extending through the torque reaction absorber and being loosely looped therein as shown at 24ª. The top of the wire terminates in an eye 24ᵇ. The eye is hooked to the shock absorber which comprises a number of rubber discs 25, the upper end of the shock absorber being attached to the fuselage F of the plane by means of a ring 29 and a hook 30.

Figure 7:
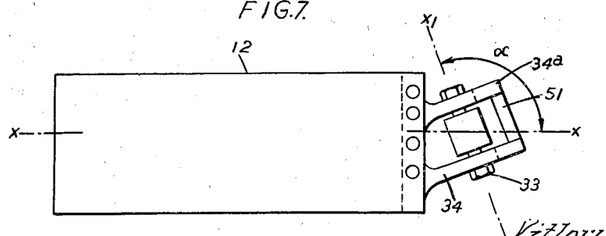
Fig. 7 is a plan view of a blade (collapsed) showing how the hinging axis $x_1, x_1$ thereof may be set in relation to the longitudinal axis of the blade to produce variable blade incidence as the blade flaps.

Within eyes 31 at the upper ends of the spigots 19 are resilient (e. g., rubber) bushes 32 through which bolts 33 on forks 34 rigid with the roots of the blades 12 extend. In this way the blades are hingedly attached to the spigots in cushioned or resilient manner. The bolts 33 may cross the axes $x—x$ of the blades at right angles as shown in Fig. 2 but preferably cut the said axes at an angle $\alpha$ as shown in Fig. 7, the axes of the said bolts inclining towards the leading edges of the blades. In Fig. 7 angle $\alpha$ is about equal to 100° but may be more or less. Owing to this setting of the axes of the bolts (Fig. 7) upward movements of the blades (when extended in a manner to be described) owing to increases of upward lift pressure result in a decrease of blade pitch angle, and vice versa.

Each blade comprises a number of telescopic sections 12ª having, with the exception of the innermost section, an internal shoulder 36 at its outer end and, with the exception of the outermost section, an external shoulder 37 at its inner end. This construction of the blade sections will be clearly seen by reference to Fig. 8 and to the upper blade of Fig. 2. The object of the shoulders is to limit the outward movement of each inner section in relation to the section immediately surrounding it.

Figure 3:
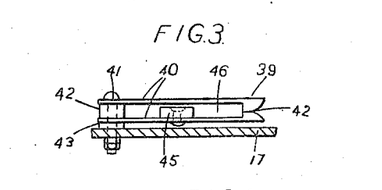
Fig. 3 is a detail showing a catch forming part of locking means for the blades when they are extended.

The blades 12, Fig. 2, are shown in their collapsed and folded condition. When the plate 11 and the member 17 rigid with it are rotated the blades swing outwards and extend by the centrifugal force generated (Fig. 5), the outward movements being on the axes of the spigots 19. The extension of the blades is limited by the engagement between the shoulders 36 and 37. In order to limit the outward swing of the blades and to lock them in the radial position (as indicated by A—A, Fig. 2) locking means is provided comprising laterally projecting tongues 38 rigid with the spigots and catches 39 for co-operation with the tongues, said catches being fixed to the member 17. Each catch comprises a pair of spring arms 40 (see Fig. 3, more especially) fixed to the member 17 by means of bolts 41, the arms being held in spaced relation by a block 42 and being held spaced from the member 17 by a washer 43. The bolts 41 extend through the said arms, block, washer and member 17. The outer or unfixed ends of the arms are enlarged and the outer sides of the enlargements are rounded as shown in Fig. 3 to provide a flared entry 42 to the space between the arms. The back ends of the enlargements are perpendicular to the arms and rearwards of the said back ends is located a stop 45, the stop being fixed to the lower arm and being almost as deep as the space between the arms. Thus, when the blades swing outwards centrifugally the tongues force their way into the gaps 46 bounded by the stop, the arms and the enlargements and are trapped there, the blades thus being locked in their outwardly extending positions. Owing to the tongues 38 being fixed to the flanges and not to the blades the locking means cannot hinder the flapping movements of the blades.

Figure 4:
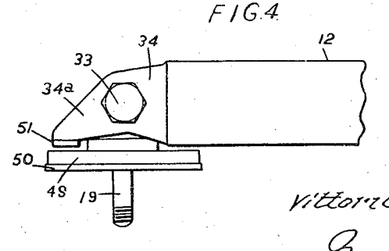
Fig. 4 is a detail showing elastic means for limiting the flapping movements of the blades.

In order to limit the said flapping movements (the hinging movements of the blades about the axes of the bolts 33) buffers 49 (Figs. 1 and 4) of rubber or other suitable resilient material are fixed to the flanges 50 rigid with the spigots 19, the arms 34 are extended at 34ª and feet 51 are fixed beneath the extensions so that engagement of the feet with the buffers limits upward movement of the blades and engagement of the roots of the blades with the buffers limits downward movement.

Part of the harness for the falling body is indicated by 53, Fig. 1. The harness is attached to the carrier 1 by means of a ball and socket joint 54, the socket being riveted to the flange 4. Springs 55 between a yoke 56 at the top of the harness and the flange 4 stabilise the carrier 1 and the harness relatively but permit the pilot when he is in the falling body or cabin to tilt the said carrier relatively to the harness during descent, the pilot effecting the tilting by pulling on a lever 57 which is hinged to the carrier at 58 and, when required for use, can be lowered to the dotted line position shown.

The torque reaction absorber comprises a number of telescopic elements or tubes 60 of aerofoil or other section which will prevent them from rotating relatively. Due to lack of space in the drawings they are figured in a much smaller length than required in practice. The tubes or elements 60 have shoulders 61 and 62 comparable with the shoulders 36 and 37 of the blade sections 12ª, the shoulders 61 and 62 co-operating in pairs to limit the downward extension of the tubes. The outermost tube or element is fixed as at 63ª and 63ᵇ to the outer ends of the horizontal arms of a pair of bell crank levers as 64 which in turn are hingedly attached to the fuselage F of the plane by brackets 65. The second arms 66 of the bell crank levers depend and lie adjacent to a shock absorber 67 of rubber or the like fixed to the fuselage.

Within the lower part of the innermost element 60 is the upper part of a lewis 68 which when extended as shown cannot rotate in the tube. A loop 69 at the bottom of a pendant, flexible wire 70 passes round the knuckle of the toggle 71 of the lewis; the wire after deflection round a pulley 72 mounted in the outermost tube 60 is wound round a spring pulley 73, said pulley being mounted on the fuselage by means of brackets 74. The spring pulley may be of any suitable known type or may be constructed in a way which will be described with reference, more particularly, to Fig. 6. Alternatively the pulley may be dispensed with, the wire being directly attached to the fuselage. A compression spring 75 tends to hold the legs of the lewis spread.

The casings 15 for the bearings 13 of the starting spindle 14 of the parachute are provided with eyes 76 for the reception of the hooked ends of the arms of the lewis.

The apparatus so far described with particular reference to the drawings operates as follows, the apparatus normally being as shown in Figs. 1 and 2 except that the elements 60 are telescoped to a greater extent.

When the fall of the body and the parachute begins the telescopic tubes or elements 60 extend downwards and the loose part 24ª of the starting wire 24 is extended until the parachute is well clear of the bottom of the fuselage. During this period the wire 70 is pulled downwards and, therefore, rotates the pulley 73 whereby its spring is torsioned. The wire 24 tautens before the tubes 60 are fully extended, the pull on the wire being in the direction of the arrow c.

Figure 5:
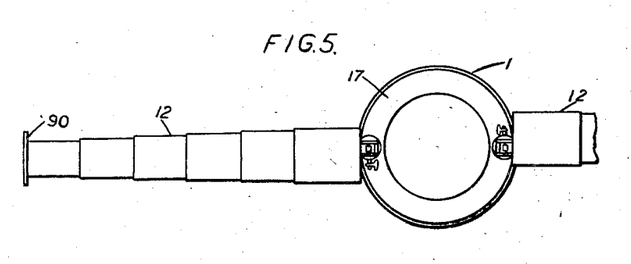
Fig. 5 is a plan view of the parachute showing the blades in the position of use (descent)

As the extension of the tubes 60 and the fall of the parachute continues the wire 24 rotates the pulley 22. Rotation of the pulley turns the member 17 on which the spigots 9 and the blades 12 are mounted. The drive transmission between the pulley and the said member 17 comprises the gearing 23 and 21. When the member 17 is turned the blades swing outwards centrifugally on the axes of the spigots and owing to the centrifugal force the sections 12ª extend. The outward swing of the blades is limited by the locking means 38—39 and by the same means inward swing of the blades is prevented; and the outward movements of the sections 12ª are limited by the shoulders 36—37. The parachute is then as shown in Fig. 5 but is still connected to the torque reaction tubes 60 by the lewis 68.

As the fall of the parachute continues the wire 24, through the pulley and the gearing, accelerates the rotation of the blades until finally the wire leaves the pulley. This moment substantially coincides with the moment at which the tubes 60 are fully extended. Throughout the starting period of the blades the hooked ends of the lewis 68 remain in the eyes 76 on the casings 15 and, therefore, the lewis transmits the torque reaction to the tubes 75 and the tubes transmit it to the fuselage.

At substantially the same moment as that at which the starting wire 24 leaves the pulley 22 the wire 70 reaches the end of its run round the pulley 73 and a considerable effort is exerted (in the direction of the arrow d) on the toggle 71. Hence the arms of the lewis 68 close and, therefore, release the apparatus from the torque absorber. Thereupon the spring pulley 73 retracts the wire 70. The parachute falls freely and air pressure acting upwardly on the blades accelerates the rotation until the normal speed of rotation is attained.

At this point it may be explained that the torque reaction absorber comprising the tubes or elements 60 and the lewis 68 performs the additional function of resisting drag, which drag will of course act oppositely to the direction of translation or parent plane travel as indicated by the arrow e in Fig. 2. Therefore, in spite of drag the axis of rotation of the blade is kept substantially at right angles to the translation. This ensures that rotation of the blades from the moment at which the wire 24 starts them is assisted by autorotation.

When the parachute lands rotation of the blades will cease. The blades may then be collapsed by hand but preferably the parachute is provided with means adapted to collapse the blades automatically when or shortly before their rotation stops.

Figure 9:
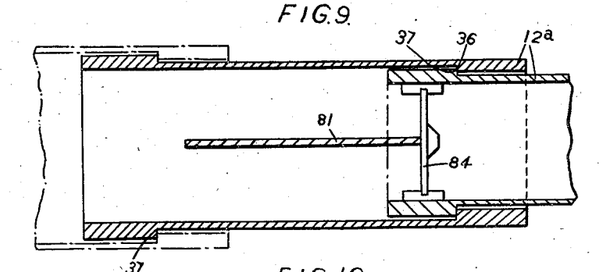
Figs. 9 and 10 are sectional side elevations of blade sections showing different ways of forming the shoulders which limit the extension of the blade sections of a telescopic blade.

The preferred means for effecting the automatic collapsing of the blades is shown in the drawings and will now be described. It comprises spring pulleys 80, one for each blade, and flexible wires or the like 81. Each wire is fixed at one end to a pulley (see Fig. 6 more especially) and after being wound round the pulley passes to the root end of the innermost section of a blade by way of holes 82 and 83 in the elements 17 and 50, respectively, and by way of openings in the root ends of the blade sections. The end of the wire is secured to a cross piece 84 fixed in the hollow of the innermost section (Figs. 2 and 9). The spring element of the pulley is formed by an elastic band 85 stretching from a mounting stub 86 near one end of the pulley to a mounting stub 87 at the other end, said stubs having flanges 88 whereby they are fixed to the underside of the top plate 11 and said band extending through the hollow of, and supporting, the pulley. A cross pin 89 at about the centre of the pulley provides a drive connection between the pulley and the band.

When the blades rotate they extend, as previously described. The automatic extension causes the innermost blade sections to pull the wires or the like 81 outwards with the result that the pulleys 80, around which the wires are normally wound, rotate the pulleys and the pulleys wind or torsion the elastic bands 85. Upon the rotation of the blades ceasing, or shortly before the rotation ceases, the bands 85 rotate the pulleys and so, by rewinding the wires 81, retract the sections 12ᵃ, a cross pin 90 at the outer end of the innermost section picking the sections up successively as the innermost blade is retracted.

Figure 6:
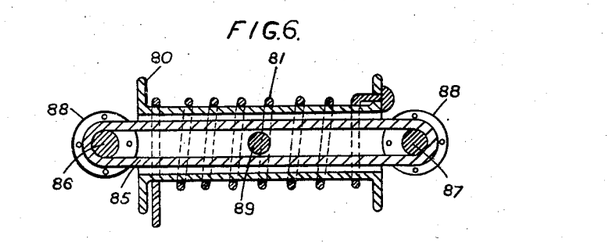
Fig. 6 is a detail, in section, showing one form of spring roller which may be used to retract the extended blades automatically when the parachute grounds.

The spring pulley 73, may as previously stated, be constructed as described with reference to Fig. 6.

Figure 8:
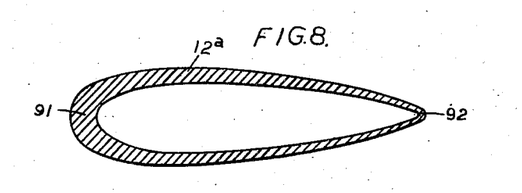
Fig. 8 is a transverse cross section of a blade section of variable wall thickness.

Fig. 8 represents a cross section of the blade sections. It has the usual symmetric aerofoil section, but the thickness varies from the leading edge 91 where it is usually the greater, to the trailing edge, where it is the smaller. In certain cases, it may be convenient to alter this kind of variation. It is to be noted, that sustaining blades, composed of elements of variable thickness, the skin of the said elements working exclusively to the whole of the stresses which can be exerted on them, is a novelty in the constitution of the sustaining blades of any kind of rotating wings machines.

Figure 10:
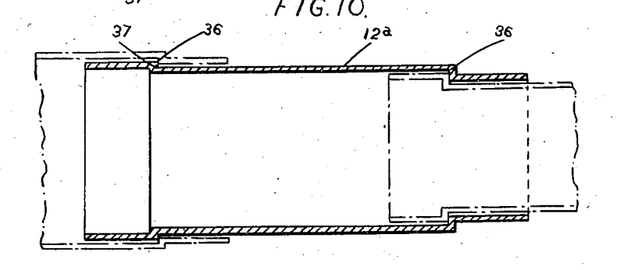

The shoulders 36 and 37 may be provided by solid enlargements on the blades as shown in Figs. 2 and 9 or by stepping the ends of the sections as shown in Fig. 10, the thickness of the sections shown in Fig. 10 being substantially constant throughout the longitudinal plane of section. The transverse section in either form of blade section may vary equally or differently as regards one blade section to another according to the requirements of their mass balance.

Figure 11:
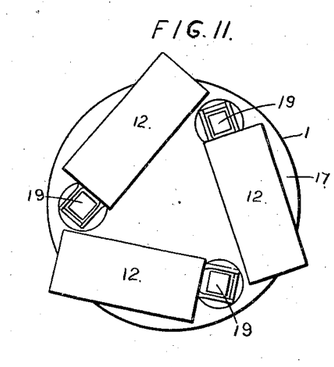
Figs. 11 and 12 are substantially diagrammatic plan views of three-blade and four-blade parachutes, respectively.
Figure 12:
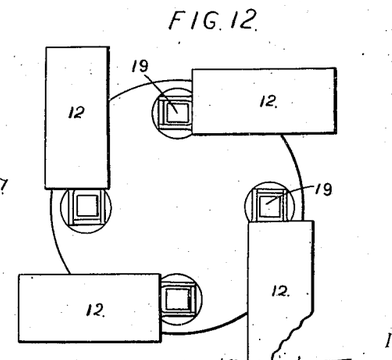

The present parachutes may be provided with more than two blades. For example, Fig. 11 shows a three-blade parachute in plan and Fig. 12 a four-blade parachute in plan. In Fig. 11 the spigots 19 are 120° apart and in Fig. 12 they are 90° apart. The blades in these two figures, their construction, mounting, locking, operation and retraction are as described with reference to the blades in the two-blade parachute.

Figure 13:
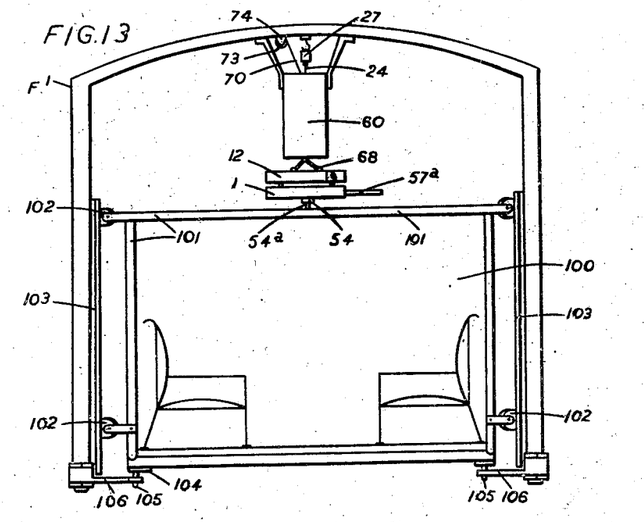
Figs. 13 and 14 show a plane cabin parachute in end elevation and in plan, respectively, part of the fuselage of a plane, which fuselage is adapted to support the plane cabin in releasable manner, also being shown. These two figures are somewhat diagrammatic.
Figure 14:
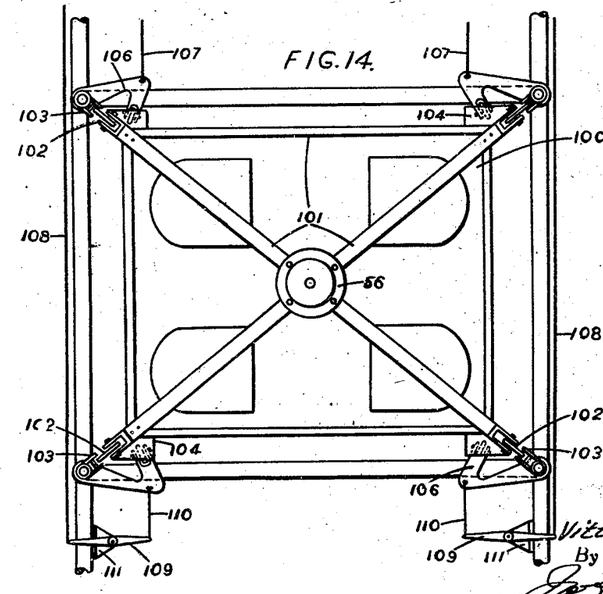

In Figs. 13 and 14 is shown the application of the invention to a safety device for a number of plane passengers. This device comprises a cabin 100 adapted to be released from a plane and provided with a parachute as previously described which comes into operation shortly after the cabin is allowed to drop. The parachute is provided with a mechanical torque reaction absorber comprising elements 60 and a lewis 68 as described with reference to Fig. 1, the outer element being attached to the fuselage F¹ of the plane. The cabin has a tubular framework generally indicated by 101 to the roof diagonals of which the ball headed spigot 54ᵃ of a ball and socket joint 54 is secured. The cabin is provided exteriorly of its corners with upper and lower rollers 102 lying in vertical tracks 103, the tracks being rigid with the fuselage F¹. Plane feet 104 at the bottoms of the said corners rest on rollers 105; the rollers are mounted on horizontal arms 106 hingedly attached to the fuselage in such a manner that they and the rollers 105 can be swung clear of the feet 104 and of the cabin. Thus, when the arms 106 are in the position shown the cabin is supported in the plane and when they are swung clear the cabin can drop from the plane through the open bottom thereof.

Two of the rollers 105 are so swung by the direct pull of cables 107; the other two rollers 105 are swung clear by the pull of cables 108 connected to them by levers 109 and short cables 110, the pivots of the levers 109 being borne by brackets 111 mounted on the fuselage. The cables 107 and 108 are under the control of the pilot and are so interconnected that they operate simultaneously when he pulls them.

Upon the cabin being allowed to fall the elements 60 extend. The wire 24, which is attached to the shock absorber 27, is slack enough to remain ineffective on the starting pulley (22, Figs. 1 and 2) until the cabin is clear of the fuselage. Thereafter the wire rotates the pulley to cause rotation and extension of the blades. The moments at which the elements 60 are fully extended, the lewis 68 released and the wire 24 runs clear of the starting pulley substantially coincide. Until the lewis operates, the tubes or elements 60, besides resisting torque reaction, resist drag as and for the purpose described with reference to Figs. 1 and 2. When the lewis releases the cabin the said lewis and the tubes 60 are retracted by the spring pulley 73 and the wire 70. A steering lever 57ᵃ normally projects from the case of the parachute.

Instead of providing a plane cabin with a single sustaining parachute as above described the plane cabin may be provided with two or more parachutes. In this case the axes of the parachutes will be parallel and their blades will be arranged to rotate in the same direction.

It is evident that the invention is not limited by the devices described, and that other forms of realization can be utilised as long as the principles are not altered.

For example: the gearing starting system may be altogether different and located differently with respect to the top cover-plate. The mounting of the parachute over the falling body harness, may be realised by a double articulation instead of a spherical joint and in cases of a falling body without pilot articulation may be omitted. The elastic shock absorber fixed to the hook of the fuselage may form part of the parachute and not be fixed to the fuselage, it may constitute in fact the upper end of the starting wire which is located inside the general canvas cover.

The retractive system may also have metal springs instead of elastics.

The bearings of the falling cabin against the fuselage, may also be made without the rollers, metal ends of suitable shape being possibly utilised in certain cases. The release device of the cabin may also be different.

Double range of supporting levers for the falling cabin, the first near the bottom and the second near the top of the fuselage, can be utilised.

The torque reaction and drug absorbers may be made of any suitable design and shape.

What I claim is:

1. A parachute to support the free descent of a body from an aircraft comprising a support, interfitting telscopic blade sections of aerofoil form rotatable on said support, means to rotate said blades shortly after the start of the fall and thereby to effect development and extension of the telescopic sections by virtue of the centrifugal force generated during said rotation, elements to limit the extension of said blade sections and mechanical means responsive to the initial part of the fall of the body from the aircraft to actuate said means to rotate the blades.

2. A parachute to support the free descent of a body from an aircraft comprising a support, interfitting telescopic blade sections of aerofoil form rotatable on said support, a pivot mounting on said support for one of said blade sections said section forming the root section of the blade, a rotary carrier for said pivot mounting to rotate said mounting bodily in relation to the support shortly after the start of the fall to swing out the blade by centrifugal force and permit extension of the telescopic sections thereof, means on said telescopic sections to limit the extension thereof and mechanical means responsive to the first part of the fall of the body from the aircraft to actuate said rotary carrier.

3. A parachute to support the free descent of a body from an aircraft, comprising a support, freely rotatable telescopic sustaining blades thereon, means fixed to the aircraft and responsive to the fall of the parachute to impart an initial rotation to said blades, and means to release from the parachute said means fixed to the aircraft after the blades have been set into initial rotation by the energy resulting from the fall.

4. A parachute to support the free descent of a body from an aircraft, comprising a support, freely rotatable telscopic sustaining blades thereon, a starting element fixed to the aircraft, a drive pulley on said support and around which said starting element passes, means whereby said drive pulley rotates said blades during the initial starting period while the starting element is driving said pulley and before the element leaves the pulley, a torque reaction member between the parachute and the aircraft and means to release the parachute from the torque reaction member.

5. A parachute to support the free descent of a body from an aircraft, comprising a support, a rotatable blade carrier thereon, freely expansible telescopic blades of aerofoil section pivotally mounted on said carrier, a drive pulley geared to said carrier, a starting element encircling said drive pulley, said starting element driving said pulley and said carrier during the initial part of the fall to effect initial rotation and expansion of the blades to the operative position and passing off said pulley at the end of the starting period, a torque reaction member between the parachute and the aircraft and means to release the parachute from the torque reaction member at about the same time as the starting element leaves the pulley.

6. A parachute to support the free descent of a body from an aircraft, comprising a support, a rotatable blade carrier thereon, freely expansible telescopic blades of aerofoil section pivotally mounted on said carrier, a drive pulley geared to said carrier, a flexible starting element encircling said drive pulley, said starting element driving said pulley and said carrier during the initial part of the fall to effect initial rotation and expansion of the blades to the operative position and passing off said pulley at the end of the starting period, a torque reaction member between the parachute and the aircraft, a yieldable mounting on the aircraft for said torque reaction member, said mounting acting as a shock absorber and means to release the parachute from the torque reaction member at about the same time as the starting element leaves the pulley.

7. A parachute to support the free descent of a body from an aircraft, comprising a support, a rotatable blade carrier thereon, freely expansible telescopic blades of aerofoil section pivotally mounted on said carrier, a drive pulley geared to said carrier, a flexible starting element encircling said pulley, said starting element driving said pulley and said carrier during the initial part of the fall to effect initial rotation and expansion of the blades to the operative position and passing off said pulley at the end of the starting period, a yieldable mounting on the aircraft for the end of the starting element said mounting acting as a shock absorber for said element, a torque reaction member, a yieldable mounting on the aircraft for said torque reaction member, said mounting acting as a shock absorber and means to release the parachute from the torque reaction member at about the same time as the starting element leaves the pulley.

8. A parachute to support the free descent of a body from an aircraft, comprising a support, a rotatable blade carrier thereon, freely expansible telescopic blades of aerofoil section pivotally mounted on said carrier, a drive pulley geared to said carrier, a flexible starting element encircling said drive pulley, said starting element driving said pulley and said carrier during the initial part of the fall to effect initial rotation and expansion of the blades to the operative position and passing off said pulley at the end of the starting period, a torque reaction member between the parachute and the aircraft, said torque reaction member including telescopic sections of aerofoil section, means on said telescopic sections to limit the extension of said absorber, a yielding mounting on the aircraft for the said torque reaction member and means to release the parachute from the torque reaction member at about the same time as the starting element leaves the pulley.

9. A parachute to support the free descent of a body from an aircraft, comprising a support, a rotatable blade carrier thereon, freely expansible telescopic blades of aerofoil section pivotally mounted on said carrier, a drive pulley geared to said carrier, a flexible starting element encircling said drive pulley, said starting element driving said pulley and said carrier during the initial part of the fall to effect initial rotation and expansion of the blades to the operative position and passing off said pulley at the end of the starting period, a torque reaction member between the parachute and the aircraft, said torque reaction member including telescopic sections of aerofoil section, means on said telescopic sections to limit the extension of said absorber, a yielding mounting on the aircraft for the said torque reaction member, means to release the parachute from the torque reaction member, and means to effect retraction of the torque reaction member at about the same time as the release therefrom of the parachute.

10. A parachute to support the free descent of a body from an aircraft comprising a support, interfitting telescopic blade sections of aerofoil form rotatable on said support, said aerofoil blade sections being thicker in wall section at the leading edge than at the trailing edge, means to rotate said blades at the start of the fall and thereby to effect development and extension of the telescopic sections by virtue of the centrifugal force generated during said rotation, means to limit the extension of said blade sections and mechanical means responsive to the initial part of the fall of the body from the aircraft to actuate said means to rotate the blades.

11. A parachute to support the free descent of a body from an aircraft, comprising a support, a rotatable carrier on said supports, vertical pivots on said carrier, telescopic blades mounted on said pivots, said blades being formed of telescopic sections of aerofoil section and lying in an out-of-use position over said case, a pulley, gearing from said pulley to said carrier, a flexible starting element encircling said pulley fixed to the aircraft whereby the fall of the parachute rotates said pulley and thence said carrier thereby swinging out the blades on the vertical pivots and permitting the extension of the telescopic sections by centrifugal force, locking means to secure the blades in the swung-out position and a shock absorber to absorb shock due to the outward swing of the blades.

12. A parachute to support the free descent of a body from an aircraft, comprising a support, a rotatable carrier on said support, vertical pivots on said carrier, telescopic blades mounted on said pivots, said blades being formed of telescopic sections of aerofoil section and lying in an out-of-use position over said support, a pulley, gearing from said pulley to said carrier, a flexible starting element encircling said pulley fixed to the aircraft whereby the fall of the parachute rotates said pulley and thence said carrier thereby swinging out the blades on the vertical pivots and permitting the extension of the telescopic sections by centrifugal force, locking means to secure the blades in the swung-out position, a shock absorber to absorb shock due to the outward swing of the blades, a torque reaction member on the aircraft to guide the parachute during the initial part of the fall while the blades are being set into rotation by the action of the starting element on the pulley, and to resist the air pressure exerted on the falling body and on the parachute, said torque reaction member comprising interfitting telescopic sections, means on said telescopic sections to limit the extension thereof, a yielding connection between said torque reaction member and the aircraft, a releasable connection between said torque reaction member and the parachute case and a universal joint between said case and the body.

13. A parachute to support the free descent of a body from an aircraft, comprising a support, a rotatable carrier on said support, vertical pivots on said carrier for a blade mounting, horizontal pivots on said blade mounting, telescopic blades mounted on said horizontal pivots adapted to be swung out to an operative position by rotation of said carrier and to flap freely about said horizontal pivots in use, said blades being formed of telescopic sections of aerofoil section and lying in an out-of-use position over said support, a pulley, gearing from said pulley to said carrier, a flexible starting element encircling said pulley fixed to the aircraft whereby the fall of the parachute rotates said pulley and thence said carrier thereby swinging out the blades on the vertical pivots and permitting the extension of the telescopic sections by centrifugal force, locking means to secure the blades in the swung-out position and a shock absorber to absorb shock due to the outward swing of the blades.

14. A parachute to support the free descent of a cabin from an aircraft, comprising a support, interfitting telescopic blade sections of aerofoil form rotatable on said support, means to rotate said blades at the start of the fall and thereby to effect development and extension of the telescopic sections by virtue of the centrifugal force generated during said rotation, stop means to limit the extension of said blade sections, mechanical means responsive to the initial part of the fall from the aircraft to actuate said means to rotate the blades, cooperating guide members on the cabin and on the aircraft and releasable members to retain the cabin in the aircraft.

15. A parachute to support the free descent of a body from an aircraft comprising a plurality of parachute support, interfitting telescopic blade sections of aerofoil form rotatable on each of said supports, means to rotate said blades at the start of the fall and thereby to effect development and extension of the telescopic sections by virtue of the centrifugal force generated during said rotation, stop means to limit the extension of said blade sections and mechanical means responsive to the initial part of the fall of the body from the aircraft to actuate said means to rotate the blades.

16. A parachute to support the free descent of a body from an aircraft, comprising a support, a rotatable blade carrier thereon, freely expansible telescopic blades of aerofoil section pivotally mounted on said carrier, a drive pulley geared to said carrier, a flexible starting element encircling said drive pulley, said starting element driving said pulley and said carrier during the initial part of the fall to effect initial rotation and expansion of the blades to the operative position and passing off said pulley at the end of the starting period, an expansible torque reaction member adapted to support the parachute during the initial part of the fall, a scissors connection at the base of the torque reaction member, elements on said base engaged by said scissors connection, a release element attached to said scissors connection, a spring drum on the aircraft to which the end of the release element is attached and a spring on said scissors connection to maintain engagement between said connection and the support during the initial part of the descent and until the pull on the release element displaces the scissors connection and effects disconnection from the support, this release being at about the same time as the starting element leaves the pulley.

17. A parachute to support the free descent of a person from an aircraft, comprising a support, freely rotatable sustaining blades thereon, means to rotate the blades shortly after the start of the fall, mechanical means responsive to the initial part of the fall from the aircraft to actuate said means to rotate the blades thereby to initiate rotation of the blades shortly after the fall after which they continue to rotate freely during the fall, and means controlled by the falling person to incline the axis of rotation of the blades thereby to control the direction of free descent.

18. A parachute to support the free descent of a person from an aircraft, comprising a support, freely rotatable sustaining blades thereon, means to rotate the blades shortly after the start of the fall, mechanical means responsive to the initial part of the fall of the body from the aircraft to actuate said means to rotate the blades thereby to initiate rotation of the blades shortly after the fall after which they continue to rotate freely during the fall, a harness to attach the parachute support to the falling person, a universal joint connecting the support to the harness, springs to damp the movement of the support in relation to the harness and a lever on the support accessible to control by the falling person to regulate the orientation of the blades and thereby to control the direction of free descent.

19. A parachute to support the free descent of a body from an aircraft, comprising a support, a rotatable carrier on said support, vertical pivots on said carrier for a blade mounting, horizontal pivots on said mounting, telescopic blades arranged on said horizontal pivots disposed at an oblique angle to the length of the blades and adapted to be swung out to an operative position by rotation of said carrier and to flap freely about said horizontal pivots in use, said blades being formed of telescopic sections of aerofoil section and lying in an out-of-use position over said support, a pulley, gearing from said pulley to said carrier, a flexible starting element encircling said pulley fixed to the aircraft whereby the fall of the parachute rotates said pulley and thence said carrier thereby swinging out the blades on the vertical pivots and permitting the extension of the telescopic section by centrifugal force, locking means to secure the blades in the swung-out position and a shock absorber to absorb shock due to the outward swing of the blades.

20. A parachute to support the free descent of a body from an aircraft, comprising a support, telescopically extensible sustaining blades thereon adapted to be extended by centrifugal force when set into rotation, means to impart an initial rotation to said blades shortly after commencement of the fall and drive means responsive to the fall of the body from the aircraft to actuate said means to rotate the blades thereby to transform the energy resulting from the initial fall of the parachute and the falling body into a rotational movement of the blades.

21. A parachute to support the free descent of a body from an aircraft, comprising a support, telescopically extensible sustaining blades thereon adapted to be extended by centrifugal force when set into rotation, means to rotate the blades shortly after the start of the fall and mechanical means responsive to the initial part of the fall of the body from the aircraft to actuate said means to rotate the blades thereby to transform the energy resulting from the initial fall of the parachute and the falling body into a rotational movement of the blades shortly after the start of the fall after which they continue to rotate freely during the fall.

VITTORIO ISACCO.

REFERENCES CITED

The following references are of record in the file of this patent:

UNITED STATES PATENTS

| Number | Name | Date |
| --- | --- | --- |
| 1,165,891 | Martin | Dec. 28, 1915 |
| 1,793,651 | Thorsen | Feb. 24, 1931 |
| 1,855,084 | Alvistur | Apr. 19, 1932 |
| 2,048,950 | Roepke | July 28, 1936 |
| 2,329,414 | Nelson | Sept. 14, 1943 |

FOREIGN PATENTS

| Number | Country | Date |
| --- | --- | --- |
| 379,812 | Germany | Aug. 29, 1923 |
| 800,738 | France | May 11, 1923 |
| 814,599 | France | Mar. 22, 1937 |